(12) United States Patent
Lehmann

(10) Patent No.: US 7,549,557 B2
(45) Date of Patent: Jun. 23, 2009

(54) DEVICE FOR SEPARATING OBJECTS

(75) Inventor: Ralf Lehmann, Hamburg (DE)

(73) Assignee: Borgwaldt KC GmbH, Hamburg (DE)

( * ) Notice: Subject to any disclaimer, the term of this patent is extended or adjusted under 35 U.S.C. 154(b) by 0 days.

(21) Appl. No.: 10/582,775

(22) PCT Filed: Dec. 16, 2004

(86) PCT No.: PCT/EP2004/014348

§ 371 (c)(1),
(2), (4) Date: Apr. 10, 2007

(87) PCT Pub. No.: WO2005/058735

PCT Pub. Date: Jun. 30, 2005

(65) Prior Publication Data

US 2007/0224028 A1    Sep. 27, 2007

(30) Foreign Application Priority Data

Dec. 16, 2003  (DE) ............................... 103 58 976

(51) Int. Cl.
*B65G 59/06* (2006.01)
(52) U.S. Cl. .................. 221/251; 221/260; 221/208; 414/797.7
(58) Field of Classification Search ......... 221/1–312 C, 221/251, 260; 414/797.7
See application file for complete search history.

(56) References Cited

U.S. PATENT DOCUMENTS

| 4,308,974 | A | * | 1/1982 | Jones ........................ 221/196 |
| 4,928,511 | A | * | 5/1990 | Sirvet ........................ 72/361 |
| 5,251,784 | A | | 10/1993 | Chacon Sevila et al. |
| 5,318,194 | A | * | 6/1994 | Wiese ........................ 221/123 |
| 5,370,496 | A | | 12/1994 | Neukam et al. |
| 5,628,428 | A | * | 5/1997 | Calhoun et al. ............. 221/197 |
| 6,073,801 | A | * | 6/2000 | McGarrah ................... 221/298 |
| 6,250,499 | B1 | * | 6/2001 | Gardner ...................... 221/210 |
| 6,510,938 | B1 | * | 1/2003 | Bowlin ........................ 198/450 |

FOREIGN PATENT DOCUMENTS

EP    0 343 505 A    11/1989

OTHER PUBLICATIONS

International Search Report of PCT/EP2004/014348, date of mailing Mar. 16, 2005.

* cited by examiner

*Primary Examiner*—Gene Crawford
*Assistant Examiner*—Michael K Collins
(74) *Attorney, Agent, or Firm*—Westerman, Hattori, Daniels & Adrian, LLP.

(57) ABSTRACT

Disclosed is a device for separating objects from a quantity of objects located in a receptacle. In order to keep the constructional and technical effort of said device low while allowing for great tolerance regarding the dimensions or diameters of the objects, a pivotable flap is provided at the outlet of the receptacle for releasing an object that is to be separated while an element for retaining the remaining objects in the receptacle is provided above the flap in the direction of movement of the objects.

4 Claims, 2 Drawing Sheets a)    b)    c)

DEVICE FOR SEPARATING OBJECTS

FIELD OF THE INVENTION

The invention relates to a device for isolating cigarettes from a quantity of cigarettes disposed in a shaft in accordance with the first part of claim 1.

BACKGROUND OF THE INVENTION

Devices for isolating articles are used in the cigarette industry for example, in order to isolate cigarettes or filter-ends from a quantity of cigarettes or a quantity of filter-ends so that they can be further processed individually or, in particular, be used individually as test specimens for subsequent measuring processes. Known devices, such as are illustrated in FIG. 1 and FIG. 2 for example, comprise rotatable drums 1 at the outlet of containers 2 which can be downwardly tapering containers (c.f. FIG. 1) or magazines in the form of shaft-like cassettes in which the articles lie one above the other (c.f. FIG. 2). The drums comprise slots 3 into which the individual cigarettes 4 fall and are carried along when the drum 2 rotates so that they are available individually for further use. The disadvantage of this so-called drum isolating process is that articles, cigarettes for example, of different dimensions or diameters cannot be isolated with these devices. This means that even in the case of a small deviation of the dimension of the articles, for example for a small change in the diameter of the cigarettes, the drum must then be exchanged, this thereby leading to increased complexity in the provision of components for the device and longer periods of inactivity.

A further known device for isolating articles is illustrated schematically in FIG. 3. Two pawls 5, 6 are arranged one above the other at a distance which corresponds to the dimension of the articles that are to be isolated, for example the diameter of the cigarettes 4 that are to be isolated and they are adapted to be inserted laterally into a shaft-like cassette in which the articles that are to be isolated are located one above the other. Before the lower pawl 6 is moved out of the shaft 7 so as to release the lowest article, the upper pawl 5 is moved into the shaft 7 in order to hold back those cigarettes 4 that are located thereabove in the shaft. In like manner to the drum isolating process, this so-called pawl isolating process also has the disadvantage that only articles having small tolerances in the diameter thereof can be isolated therewith since the distance between the two pawls 5, 6 that are arranged one above the other must correspond to the dimensions of the articles, for example, to the diameter of the cigarettes that are to be isolated. A further disadvantage of the pawl isolating process is that there is a danger of damaging the articles when moving the upper pawl 5 into the shaft 7.

A vending machine is known from the publication EP-A-0 343 505 which comprises a pivotal flap arranged at the outlet of a container for releasing an isolated article and also a further flap which is arranged in the container above the flap for the releasing process, whereby the flap for holding back the articles is biased towards the interior of the container by means of a spring. Hereby, the two flaps are each operable independently of the other.

An automatic output unit for vending machines is known from the publication U.S. Pat. No. 5,628,428, wherein a pivotal base-plate is arranged at the outlet of a compartment in which articles that are to be sold are stacked. For the purposes of releasing an article, the flap is folded downwardly whereby a retention element is simultaneously pressed laterally against the penultimate article in the stack in order to prevent the release of further articles. Hereby, the retention element presses hard against the article so that it could be deformed or damaged especially if the article is resilient and susceptible to damage.

Consequently, the object of the invention is to provide a device for isolating cigarettes or cigarette filters with the aid of which it is even possible to carefully isolate cigarettes that are of different dimensions or diameters and which are resilient or damageable at small constructional and equipmental expense.

SUMMARY OF THE INVENTION

The object posed is achieved in accordance with the characteristic features of Claim 1. In contrast to the conventional devices for isolating articles, the device in accordance with the invention is characterized in that it is constructionally simple, uses few components and thus has low operating and maintenance costs and, in particular, is not prone to trouble. A special advantage of the device in accordance with the invention is also that it allows, in particular, for high tolerances in regard to the dimensions of the cigarettes that are to be isolated, for example, a broad range of diameters. The use of a resilient thrust piece as a retaining element is particularly advantageous in the case of cigarettes or filter-ends that are to be isolated and which are resilient and/or damageable.

In accordance with the invention, the flap and the retaining element are parts of a pivotal element. It is thereby possible to effect both the release of an article and the retention of the articles located thereabove by means of a single pivotal movement. Consequently, the functioning of the device is very simple and is thus, in particular, little prone to trouble whilst utilizing only a small number of individual components.

Further in accordance with the invention, a cigarette is released by a rotary movement of the pivotal element and thus of the flap. At the same time, the retaining element enters the outlet path for the purposes of retaining further cigarettes by virtue of this rotary movement.

In connection with the use of a resilient thrust piece, it is advantageous that the article which follows the emerging article is not only held back but is also clamped in the container or a following shaft. This is advantageous in particular when the articles that are to be isolated are cigarettes.

Advantageously, the container is a cassette in which the articles that are to be isolated are arranged in a shaft one above the other.

The phrase cigarettes that are to be isolated is also to be understood as including filter-ends for cigarettes.

BRIEF DESCRIPTION OF THE DRAWINGS

The invention as well as further details and advantages thereof are explained hereinafter with the aid of preferred exemplary embodiments taken with reference to the Figures. Therein.

DETAILED DESCRIPTION

Figure 1:
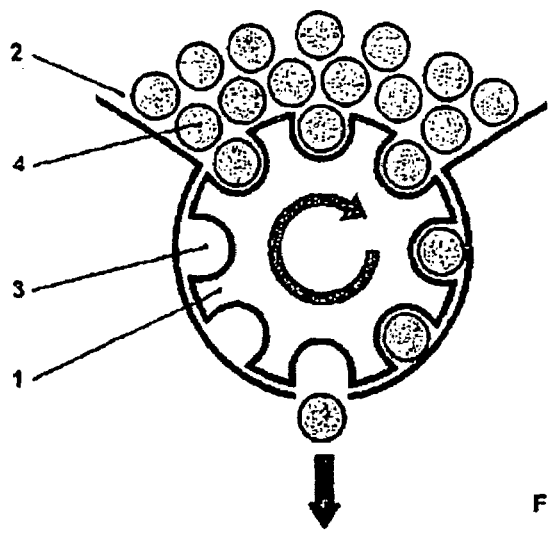
FIG. 1 shows a conventional device for isolating articles contained in a magazine by means of an isolating drum in the form of a schematic illustration.
Figure 2:
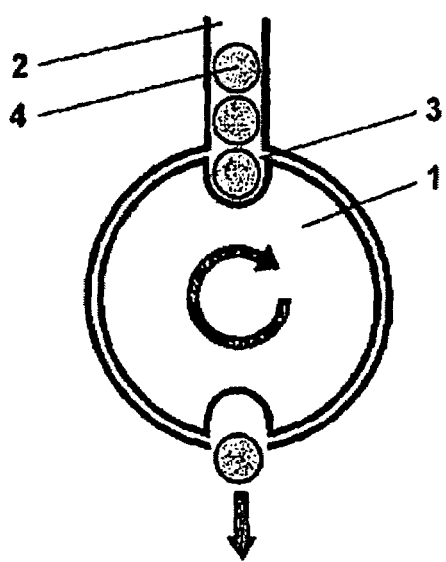
FIG. 2 shows a further conventional device in the form of a schematic illustration, wherein the articles are arranged in a shaft and are isolated by means of an isolating drum.
Figure 3:
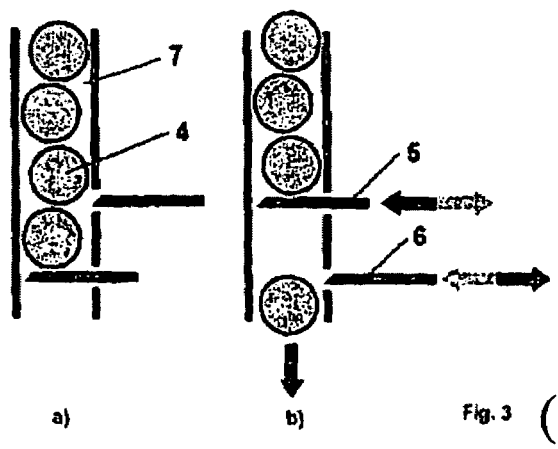
FIG. 3 shows a schematic illustration of a conventional device using pawls for isolating articles which are located in a shaft.
Figure 4:
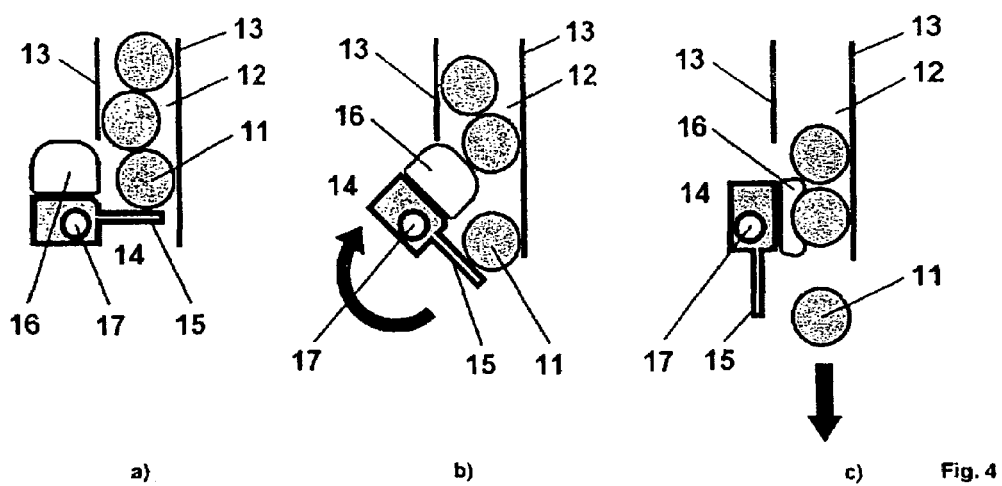
FIGS. 4a, 4b, 4c show schematic illustrations of an embodiment of an isolating device in accordance with the invention for the purposes of explaining the inventive principle and its manner of functioning.
Figure 5:
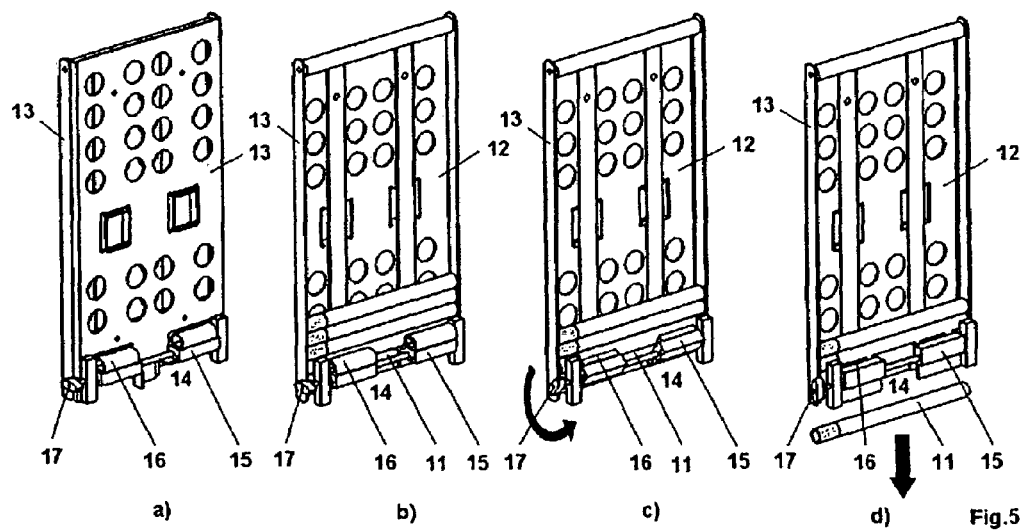
FIGS. 5a, 5b, 5c, 5d show perspective schematic diagrams which correspond to the schematic cross-sectional illustrations illustrated in FIG. 4.

As is depicted in FIGS. 4 and 5, rod-shaped articles 11; here cigarettes 11, are located in a shaft 12 of a container 13 in which the cigarettes 11 are disposed one above the other. A pivotal element 14 consists of a flap 15 and a retaining element 16 which is resilient in this embodiment. The pivotal element 14 and hence the flap 15 as well as the retaining element 16 are rotatable about a shaft 17. The front wall of the container 13 is not illustrated in FIGS. 5a, 5b, 5c so as to provide a better overview.

In the basic position illustrated in FIGS. 4a and 5a, the flap 15 is located crosswise in the shaft 12 and holds back the cigarettes 11, whilst the retaining element 16 is located outside the shaft 12. As is illustrated in FIGS. 4b and 5b, the pivotal element 14 is pivoted in the clockwise direction through approx. 45° in correspondence with arrow 18. In this position, the lowest cigarette 11 is still held by the flap 15. However, the retaining element 16 is swung partially into the shaft 12 and restrains the cigarette located above the lowest cigarette 11 from further downward movement.

Finally, the position in which the pivotal element 14 is pivoted through 90° and is located in its end position is illustrated in FIGS. 4c and 5c. The flap 15 is now completely outside the shaft 12 so that the lower cigarette 11 emerges from the container 13 or the shaft 12. At the same time, the subsequent cigarette is clamped in the shaft 12 by the resilient retaining element 16 so that it and the cigarettes located thereabove remain in the shaft 12.

After the pivotal element 14 has rotated back through 90°, the flap 15 and the retaining element 16 are again in the basic position shown in FIGS. 4a and 5a so that the next isolating process can be commenced afresh.

The invention has been described hereinbefore on the basis of a preferred exemplary embodiment. However, numerous modifications and arrangements are possible for the skilled person without thereby departing from the spirit and scope of the invention. Whilst the flap 15 and the retaining element 16 consist of two parts (see FIGS. 5a, 5b and 5c) in the illustrated embodiment, just one flap and/or or just one retaining element could also be used, this preferably extending in the central portion or over the entire length of the article that is to be isolated. Moreover, it is possible for example, to use a magazine that tapers downwardly towards the outlet end instead of using a shaft for accommodating the articles that are to be isolated.

The invention claimed is:

1. A device for isolating cigarettes from a quantity of cigarettes located in a shaft, comprising:
   a pivotal flap at the outlet of the shaft for releasing one cigarette that is to be isolated; and
   a retaining element for holding back the remaining cigarettes in the shaft which is disposed above the flap in the direction of movement of the cigarettes whereby the retaining element is a resilient thrust piece,
   wherein the flap and the retaining element are parts of a pivotal element,
   wherein during a rotary movement of the pivotal element, the flap releases one cigarette, and the retaining element enters an outlet track of the shaft for the purposes of holding back further cigarettes, and
   wherein following reverse rotation of the pivotal element, the flap is located transversely in the shaft and holds back the cigarettes, whilst the retaining element is located outside the shaft.

2. The device of claim 1, wherein the resilient thrust piece clamps a succeeding cigarette in the outlet track.

3. The device of claim 1, further comprising a container in the form of a cassette in which the cigarettes are arranged one above the other in the shaft.

4. The device of claim 1, wherein the cigarettes that are to be isolated are test specimens for subsequent measuring processes.

* * * * *